(12) United States Patent
Leon et al.

(10) Patent No.: US 9,607,598 B2
(45) Date of Patent: Mar. 28, 2017

(54) ACOUSTIC SANDWICH PANEL AND METHOD

(71) Applicant: The Boeing Company, Chicago, IL (US)

(72) Inventors: Luis R. Leon, Federal Way, WA (US); David S. Nansen, Renton, WA (US); Lynne M. Mester, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/828,102

(22) Filed: Aug. 17, 2015

(65) Prior Publication Data

US 2017/0053635 A1    Feb. 23, 2017

(51) Int. Cl.
| | | |
|---|---|---|
| *G10K 11/16* | (2006.01) | |
| *G10K 11/168* | (2006.01) | |
| *B32B 3/26* | (2006.01) | |
| *B32B 3/12* | (2006.01) | |

(52) U.S. Cl.
CPC .............. *G10K 11/168* (2013.01); *B32B 3/12* (2013.01); *B32B 3/266* (2013.01); *B32B 2262/10* (2013.01); *B32B 2307/102* (2013.01); *B32B 2605/08* (2013.01); *B32B 2605/12* (2013.01); *B32B 2605/18* (2013.01)

(58) Field of Classification Search
CPC ................................ G10K 11/168; E04B 1/86
USPC ........................................ 181/222, 292, 290
See application file for complete search history.

(56) References Cited

U.S. PATENT DOCUMENTS

| | | | |
|---|---|---|---|
| 3,095,943 A | | 7/1963 | Kemp |
| 3,380,552 A | | 4/1968 | Segil et al. |
| 4,084,367 A | * | 4/1978 | Saylor .................. B29D 24/005 181/292 |
| 4,235,303 A | | 11/1980 | Dhoore et al. |
| 4,433,021 A | * | 2/1984 | Riel ...................... B29D 24/005 181/292 |
| 4,630,416 A | * | 12/1986 | Lapins ...................... E04B 1/86 181/286 |
| 4,641,726 A | * | 2/1987 | Fearon .................. E04B 1/8209 156/290 |
| 6,220,388 B1 | * | 4/2001 | Sanborn .................... E04B 1/86 181/290 |
| 6,615,576 B2 | * | 9/2003 | Sheoran ................. B64D 33/06 181/213 |
| 8,733,500 B1 | * | 5/2014 | Ayle ..................... G10K 11/172 181/284 |
| 2005/0194210 A1 | | 9/2005 | Panossian |
| 2010/0155016 A1 | * | 6/2010 | Wood ...................... F01D 25/12 165/51 |
| 2014/0077031 A1 | | 3/2014 | Benedetti et al. |

(Continued)

OTHER PUBLICATIONS

European Patent Office, Extended European Search Report, EP 16 17 0579 (Dec. 22, 2016).

*Primary Examiner* — Forrest M Phillips
(74) *Attorney, Agent, or Firm* — Walters & Wasylyna LLC

(57) ABSTRACT

A sandwich panel including a core having a first major side and an opposed second major side, the core defining cavities, a first liner sheet connected to the first major side, the first liner sheet defining apertures, wherein each aperture provides fluid communication with an associated cavity, and a bulk absorber material and/or a thermal conductor material received in at least a portion of the cavities.

20 Claims, 9 Drawing Sheets

(56) References Cited

U.S. PATENT DOCUMENTS

2015/0027629 A1   1/2015   Butler et al.

* cited by examiner

ACOUSTIC SANDWICH PANEL AND METHOD

FIELD

This application relates to sandwich panels and, more particularly, to sandwich panels having a perforated liner sheet for sound suppression.

BACKGROUND

Sandwich panels are typically formed from a core sandwiched between two liner sheets. The core may be relatively thick, yet lightweight, as compared to the liner sheets. The liner sheets may be relative thin, yet stiff. Therefore, sandwich panels typically possess relatively high strength and stiffness at relatively low weight. As such, sandwich panels are widely used in various aerospace applications.

Like traditional sandwich panels, acoustic sandwich panels include a core sandwiched between two liner sheets. One of the liner sheets is perforated, while the other liner sheet is not perforated. The core provides bulk and defines a plurality of cavities. The apertures defined by the perforated liner sheet fluidly couple the cavities with the ambient environment. Therefore, when air flows across the perforated liner sheet of an acoustic sandwich panel, the cavities in the core act as Helmholtz resonators and attenuate the sound of the associated airflow.

Because of their relatively light weight and sound attenuating capability, acoustic sandwich panels have been used in various industries, including the aerospace industry. For example, acoustic sandwich panels are commonly incorporated into bypass gas turbine aircraft engines, such as into the inlet inner barrels, fan duct walls and/or exhaust nozzles, to attenuate the noise associated with high volume airflows.

Despite advances already made, those skilled in the art continue with research and development efforts in the field of acoustic sandwich panels.

SUMMARY

In one embodiment, the disclosed sandwich panel may include a core having a first major side and an opposed second major side, the core defining cavities, a first liner sheet connected to the first major side, the first liner sheet defining apertures, wherein each aperture provides fluid communication with an associated cavity, and a bulk absorber material received in at least a portion of the cavities.

In another embodiment, the disclosed sandwich panel may include a core having a first major side and an opposed second major side, the core defining cavities, a first liner sheet connected to the first major side, the first liner sheet defining apertures, wherein each aperture provides fluid communication with an associated cavity, and a thermal conductor material received in at least a portion of the cavities.

In another embodiment, the disclosed sandwich panel may include a core having a first major side and an opposed second major side, the core defining cavities, a first liner sheet connected to the first major side, the first liner sheet defining apertures, wherein each aperture provides fluid communication with an associated cavity, and a combination of bulk absorber material and thermal conductor material received in at least a portion of the cavities.

In another embodiment, the disclosed sandwich panel may include a core having a first major side and an opposed second major side, the core defining a plurality of cavities, a first liner sheet connected to the first major side, the first liner sheet defining a plurality of apertures, each aperture providing fluid communication with an associated cavity, a second liner sheet connected to the second major side, and a plurality of inserts received in the cavities, wherein each insert includes at least one of a bulk absorber material and a thermal conductor material.

In one embodiment, the disclosed method for manufacturing an acoustic sandwich panel may include the steps of (1) assembling a core having a first major side, a second major side, and defining a plurality of cavities; (2) applying a first liner sheet to the first major side, the first liner sheet defining a plurality of apertures; (3) applying a second liner sheet to the second major side; and (4) introducing a plurality of inserts to the plurality of cavities, wherein each insert of the plurality of inserts includes a bulk absorber material and/or a thermal conductor material.

Other embodiments of the disclosed acoustic sandwich panel and method will become apparent from the following detailed description, the accompanying drawings and the appended claims.

DETAILED DESCRIPTION

Disclosed is an acoustic sandwich panel that incorporates a bulk absorber material and/or a thermal conductor material into the cavities defined by the acoustic sandwich panel. With appropriate material and quantity selection, particularly vis-à-vis cavity size, the addition of bulk absorber material and/or thermal conductor material may augment the sound attenuating and/or heat dissipating properties of the associated acoustic sandwich panel.

Figure 1:
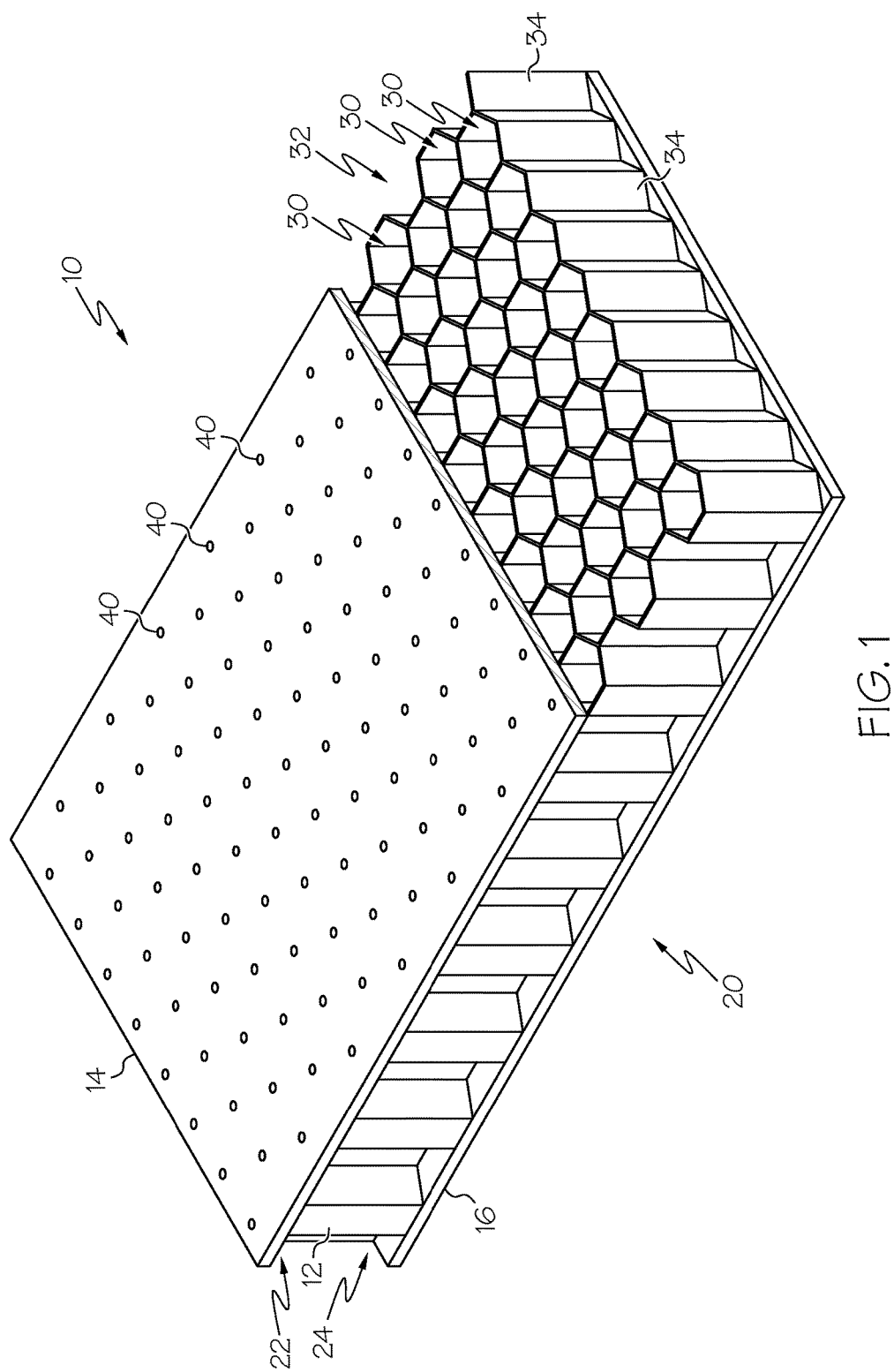
FIG. 1 is a perspective view of one embodiment of the disclosed acoustic sandwich panel.
Figure 2:
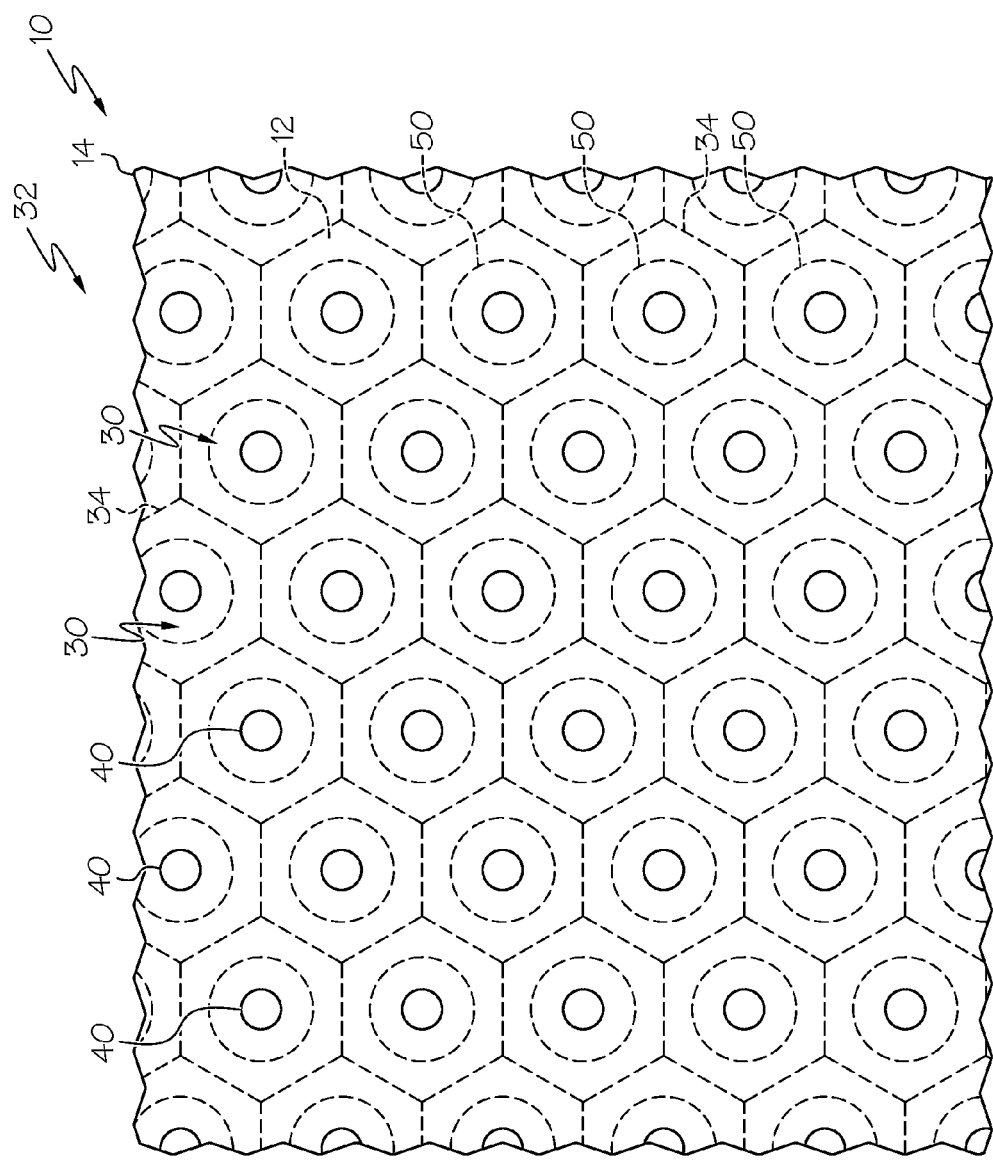
FIG. 2 is a top plan view of a portion of the acoustic sandwich panel of FIG. 1.
Figure 3:
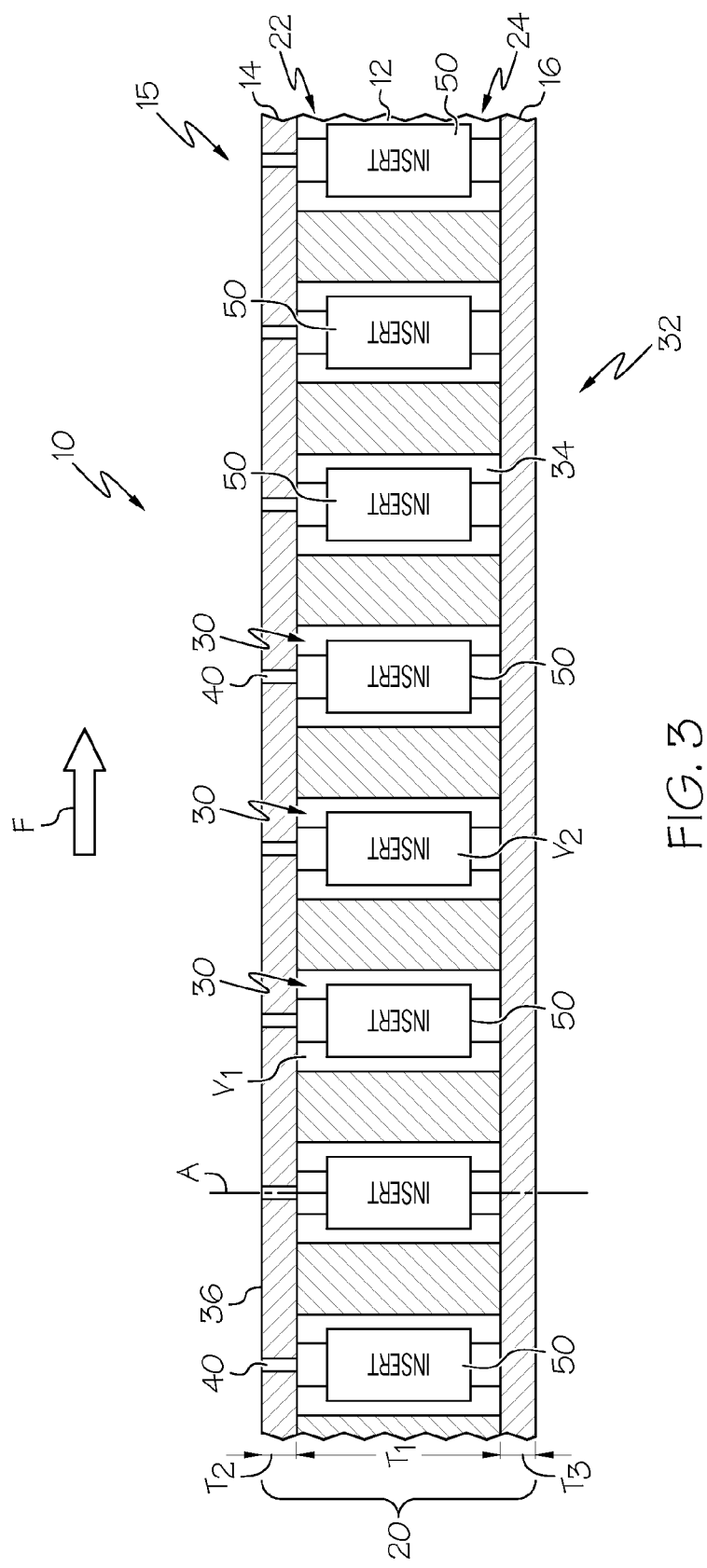
FIG. 3 is a cross-sectional view of a portion of the acoustic sandwich panel of FIG. 1.

Referring to FIGS. 1-3, one embodiment of the disclosed acoustic sandwich panel, generally designated 10, may include a core 12, a first liner sheet 14, a second liner sheet 16 and a plurality of inserts 50. The core 12, the first liner sheet 14 and the second liner sheet 16 form a layered structure 20 (FIG. 3), and the inserts 50 are positioned within the core 12 of the layered structure 20.

While the layered structure 20 of the acoustic sandwich panel 10 is shown and described having three layers (the core 12, the first liner sheet 14 and the second liner sheet 16), additional layers, such as additional core layers, additional liner sheets and/or additional other layers, may be included in the layered structure 20 without departing from the scope of the present disclosure. In certain applications, the second liner sheet 16 may be optional (or rendered optional due to application) and, therefore, may be omitted from the layered structure 20 of the acoustic sandwich panel 10 without departing from the scope of the present disclosure.

The core 12 of the acoustic sandwich panel 10 may include a first major side 22 and an opposed second major side 24. The first liner sheet 14 may be connected (e.g., adhered, welded, braised, mechanically fastened etc.) to the first major side 22 of the core 12 and the second liner sheet 16 may be connected (e.g., adhered, welded, braised, mechanically fastened etc.) to the second major side 24 of the core 12, thereby sandwiching the core 12 between the first liner sheet 14 and the second liner sheet 16, and forming the layered structure 20.

The cross-sectional thickness $T_1$ of the core 12 of the acoustic sandwich panel 10 may be relatively thick, as compared to the cross-sectional thicknesses $T_2$, $T_3$ of the first liner sheet 14 and the second liner sheet 16 (e.g., $T_1 > T_2$ and $T_1 > T_3$). In one expression, the cross-sectional thickness $T_1$ of the core 12 may be at least 1.5 times greater than the cross-sectional thickness $T_2$ of the first liner sheet 14. In another expression, the cross-sectional thickness $T_1$ of the core 12 may be at least 2 times greater than the cross-sectional thickness $T_2$ of the first liner sheet 14. In another expression, the cross-sectional thickness $T_1$ of the core 12 may be at least 5 times greater than the cross-sectional thickness $T_2$ of the first liner sheet 14. In another expression, the cross-sectional thickness $T_1$ of the core 12 may be at least 10 times greater than the cross-sectional thickness $T_2$ of the first liner sheet 14. In another expression, the cross-sectional thickness $T_1$ of the core 12 may be at least 20 times greater than the cross-sectional thickness $T_2$ of the first liner sheet 14. In yet another expression, the cross-sectional thickness $T_1$ of the core 12 may be at least 40 times greater than the cross-sectional thickness $T_2$ of the first liner sheet 14. Despite being relatively thick, the core 12 may have a relatively lower density (basis weight divided by cross-sectional thickness), as compared to the densities of the first liner sheet 14 and the second liner sheet 16.

The core 12 of the acoustic sandwich panel 10 may define a plurality of cavities 30. Each cavity 30 may have a volume $V_1$, which may be bounded by the core 12, the first liner sheet 14 and, optionally, the second liner sheet 16. Those skilled in the art will appreciate that the volume $V_1$ of each cavity 30 may be a design consideration.

In one particular realization, the core 12 of the acoustic sandwich panel 10 may have a honeycomb structure 32 that includes an array of tightly packed cells 34, with each cell 34 of the honeycomb structure 32 defining an associated cavity 30 (and cavity volume $V_1$). The cells 34 of the honeycomb structure 32 may be tubular and may have a cross-sectional shape, as best shown in FIG. 2, such as hexagonal, square, rectangular, circular, ovular, or the like. The cells 34 of the honeycomb structure 32 may extend along an axis A (FIG. 3) that is generally perpendicular to a plane coincident with the outer surface 36 (FIG. 3) of the first liner sheet 14. Therefore, the cavities 30 defined by the cells 34 of the honeycomb structure 32 may extend continuously through the core 12 from the first liner sheet 14 to the second liner sheet 16.

While a core 12 having a honeycomb structure 32 with uniform and regular-shaped cells 34 is shown and described, those skilled in the art will appreciate that cavities 30 having various three-dimensional shapes, whether regular or irregular, may be used without departing from the scope of the present disclosure. Therefore, a honeycomb structure 32 is only one specific, non-limiting example of a suitable structure for the core 12 of the acoustic sandwich panel 10.

Compositionally, the core 12 of the acoustic sandwich panel 10 may be formed from various materials or combinations of materials. Those skilled in the art will appreciate that material selection will depend on the intended application, among other possible considerations. As one example, the core 12 may be formed from a metal or metal alloy, such as steel, titanium, a titanium alloy, aluminum or an aluminum alloy. As another example, the core 12 may be formed from a composite, such as a carbon fiber-reinforced composite or a fiberglass composite. As yet another example, the core 12 may be formed from a ceramic material.

The first liner sheet 14 of the acoustic sandwich panel 10 may be layered over the first major side 22 of the core 12, thereby at least partially enclosing the cavities 30 of the core 12 along the first major side 22. Connection between the first liner sheet 14 and the core 12 may be effected using any suitable technique, the selection of which may require consideration of the composition of the core 12 and the composition of the first liner sheet 14. Examples of techniques that may be used to connect the first liner sheet 14 to the core 12 include, but are not limited to, welding, braising, soldering, bonding, adhering and/or mechanically fastening.

Compositionally, the first liner sheet 14 of the acoustic sandwich panel 10, which may be single ply or multi-ply, may be formed from various materials or combinations of materials. The composition of the first liner sheet 14 may be the same as, similar to, or different from the composition of the core 12. As one example, the first liner sheet 14 may be formed from a metal or metal alloy, such as steel, titanium, a titanium alloy, aluminum or an aluminum alloy. As another example, the first liner sheet 14 may be formed from a composite, such as a carbon fiber-reinforced composite or a fiberglass composite. As yet another example, the first liner sheet 14 may be formed from a ceramic material.

The first liner sheet 14 of the acoustic sandwich panel 10 may be perforated. Specifically, the first liner sheet 14 may define a plurality of apertures 40 extending therethrough. Each aperture 40 of the first liner sheet 14 may provide fluid communication with an associated cavity 30 in the underlying core 12. While a single aperture 40 per cavity 30 is shown in FIGS. 1-3, in an alternative construction, two or more apertures 40 per cavity 30 may be formed in the first liner sheet 14.

Thus, as best shown in FIG. 3, each aperture 40 may fluidly couple an associated cavity 30 with an airflow F moving across the first side 15 (FIG. 3) of the acoustic sandwich panel 10. Therefore, the fluid communication between the airflow F and the cavities 30 in the core 12 of the acoustic sandwich panel 10—by way of the apertures 40 of the first liner sheet 14—may allow the cavities 30 to function as Helmholtz resonators, thereby attenuating the sound of the airflow F.

The second liner sheet 16 of the acoustic sandwich panel 10 may be layered over the second major side 24 of the core 12, thereby enclosing the cavities 30 of the core 12 along the second major side 24. Connection between the second liner sheet 16 and the core 12 may be effected using any suitable technique, the selection of which may require consideration of the composition of the core 12 and the composition of the second liner sheet 16. Examples of techniques that may be used to connect the second liner sheet 16 to the core 12 include, but are not limited to, welding, braising, soldering, bonding, adhering and/or mechanically fastening.

Compositionally, the second liner sheet 16 of the acoustic sandwich panel 10, which may be single ply or multi-ply, may be formed from various materials or combinations of materials. The composition of the second liner sheet 16 may be the same as, similar to, or different from the composition of the core 12. Also, the composition of the second liner sheet 16 may be the same as, similar to, or different from the composition of the first liner sheet 14. As one example, the second liner sheet 16 may be formed from a metal or metal alloy, such as steel, titanium, a titanium alloy, aluminum or an aluminum alloy. As another example, the second liner sheet 16 may be formed from a composite, such as a carbon fiber-reinforced composite or a fiberglass composite. As yet another example, the second liner sheet 16 may be formed from a ceramic material.

Unlike the first liner sheet 14 of the acoustic sandwich panel 10, which is perforated, the second liner sheet 16 may not be perforated. Therefore, the second liner sheet 16 may not provide fluid communication between the cavities 30 of the core 12 and the environment outside of the acoustic sandwich panel 10.

At this point, those skilled in the art will appreciate that only a portion of an acoustic sandwich panel 10 is shown in FIGS. 1-3, and that the overall size and shape of the acoustic sandwich panel 10 may depend on the end application. Additionally, while the acoustic sandwich panel 10 is shown in FIGS. 1-3 as being a substantially planar structure, non-planar acoustic sandwich panels 10 (e.g., curved acoustic sandwich panes 10) are also contemplated. For example, the disclosed acoustic sandwich panel 10 may be used as a wall panel forming the inlet inner wall, fan duct and/or exhaust nozzle of a bypass gas turbine aircraft engine and, therefore, may be sized, shaped and contoured accordingly.

As best shown in FIG. 3, a plurality of inserts 50 may be inserted into the cavities 30 of the core 12 of the acoustic sandwich panel 10. Each cavity 30 of the core 12 may house an insert 50. However, advantage may still be gained by providing only some (but not all) cavities 30 of the core 12 with inserts 50. As one example, at least 10 percent of the cavities 30 of the core 12 may house an insert 50. As another example, at least 25 percent of the cavities 30 of the core 12 may house an insert 50. As another example, at least 50 percent of the cavities 30 of the core 12 may house an insert 50. As another example, at least 75 percent of the cavities 30 of the core 12 may house an insert 50. As another example, at least 90 percent of the cavities 30 of the core 12 may house an insert 50. As yet another example, about 100 percent of the cavities 30 of the core 12 may house an insert 50.

In a first implementation, the inserts 50 of the acoustic sandwich panel 10 may be (or may include) a bulk absorber material. Without being limited to any particular theory, it is believed that the presence of bulk absorber material (inserts 50) in the cavities 30 of the core 12 may further promote sound attenuation, particularly with respect to an airflow F moving across the first side 15 (FIG. 3) of the acoustic sandwich panel 10.

Various bulk absorber materials (including combinations of bulk absorber materials) may be used as the inserts 50 of the acoustic sandwich panel 10. As one specific, non-limiting example, the bulk absorber material may be aluminum oxide fibers, such as SAFFIL® aluminum oxide fibers commercially available from Saffil Ltd. of Cheshire, United Kingdom. Other non-limited examples of suitable bulk absorber materials include carbon fiber batting, ceramic batting, fiberglass batting (e.g., PYROLOFT® batting from Albany International Corp. of Albany, N.Y.), aramid fibrous material, such as KEVLAR® para-aramid fibers (E. I. du Pont de Nemours and Company of Wilmington, Del.) and NOMEX® meta-aramid fibers (E. I. du Pont de Nemours and Company), polyimide fibrous material (e.g., PYROPEL® felt from Albany International Corp.), polyurethane foam, polyester foam, polyimide foam, metal (e.g., copper or nickel) foam, aluminum and ceramic open cell foams, silicon rubber foam, and ceramic tiles (e.g., aluminum oxide and/or silicon dioxide).

Thus, suitable bulk absorber materials come in various physical forms, such as, but not limited to, foams, fibers, matting, batting, felted materials, woven fabrics and non-woven fabrics. Therefore, when the inserts 50 of the acoustic sandwich panel 10 are (or include) bulk absorber material, the inserts 50 may be provided in various physical forms. Merely for illustrative purposes, the inserts 50 are shown in FIG. 3 as simple blocks (one per cavity 30). However, as used herein, the term "insert" (singular or plural) refers to all of the bulk absorber material and/or thermal conductor material within an associated cavity, regardless of whether the insert is a single mass of material (e.g., a monolithic body) or comprised of multiple separate pieces (e.g., a clump of fibers).

At this point, those skilled in the art will appreciate that a sound attenuating quantity of the bulk absorber material (insert 50) may be used, and that the sound attenuating quantity may be dictated by, among other things, the size of the cavities 30 in the core 12 of the acoustic sandwich panel 10 and the composition of the bulk absorber material (inserts 50).

To achieve a sound attenuating quantity of bulk absorber material, the bulk absorber material may occupy at least a portion of the volume $V_1$ of each cavity 30 of the core 12 of the acoustic sandwich panel 10. In other words, each insert 50 may have a bulk volume $V_2$, and the volume $V_2$ of each insert 50 may be greater than zero and less than (or equal to) the volume $V_1$ of the associated cavity 30. In one expression, the volume $V_2$ of each bulk absorber insert 50 may be at least 10 percent of the volume $V_1$ of the associated cavity 30. In another expression, the volume $V_2$ of each bulk absorber insert 50 may be at least 20 percent of the volume $V_1$ of the associated cavity 30. In another expression, the volume $V_2$ of each bulk absorber insert 50 may be at least 30 percent of the volume $V_1$ of the associated cavity 30. In another expression, the volume $V_2$ of each bulk absorber insert 50 may be at least 40 percent of the volume $V_1$ of the associated cavity 30. In another expression, the volume $V_2$ of each bulk absorber insert 50 may be at least 50 percent of the volume $V_1$ of the associated cavity 30. In another expression, the volume $V_2$ of each bulk absorber insert 50 may be at least 60 percent of the volume $V_1$ of the associated cavity 30. In another expression, the volume $V_2$ of each bulk absorber insert 50 may be at least 70 percent of the volume $V_1$ of the associated cavity 30. In another expression, the volume $V_2$ of each bulk absorber insert 50 may be at least 80 percent of the volume $V_1$ of the associated cavity 30.

In a second implementation, the inserts 50 of the acoustic sandwich panel 10 may be (or may include) a thermal conductor material. Without being limited to any particular theory, it is believed that the presence of thermal conductor material (inserts 50) in the cavities 30 of the core 12 may improve heat dissipation by way of the acoustic sandwich panel 10, particularly when an airflow F is moving across the first side 15 (FIG. 3) of the acoustic sandwich panel 10.

Various thermal conductor materials may be used as the inserts 50 of the acoustic sandwich panel 10. As used herein, "thermal conductor material" refers to any material having a thermal conductivity of at least 10 W/(m·K). In one expression, the thermal conductor material (inserts 50) may have a thermal conductivity of at least 50 W/(m·K). In another expression, the thermal conductor material (inserts 50) may have a thermal conductivity of at least 100 W/(m·K). In another expression, the thermal conductor material (inserts 50) may have a thermal conductivity of at least 150 W/(m·K). In another expression, the thermal conductor material (inserts 50) may have a thermal conductivity of at least 200 W/(m·K). In another expression, the thermal conductor material (inserts 50) may have a thermal conductivity of at least 250 W/(m·K). In yet another expression, the thermal conductor material (inserts 50) may have a thermal conductivity of at least 300 W/(m·K).

Compositionally, use of various thermal conductor materials is contemplated. As one general, non-limiting example, the thermal conductor material may be a metal or metal alloy. As one specific, non-limiting example, the thermal conductor material may be steel. As another specific, non-limiting example, the thermal conductor material may be titanium or a titanium alloy. As another specific, non-limiting example, the thermal conductor material may be nickel or a nickel alloy. As yet another specific, non-limiting example, the thermal conductor material may be aluminum or an aluminum alloy. Use of non-metallic thermal conductor materials is also contemplated.

The thermal conductor material (inserts 50) may be used in various physical forms. As one specific, non-limiting example, the thermal conductor material (inserts 50) may be in the form of wire or tubing. As another specific, non-limiting example, the thermal conductor material (inserts 50) may be in the form of mesh. Other forms, such a powders, solid mass, monolith and the like, are also contemplated.

Various quantities of the thermal conductor material (insert 50) may be used. The specific quantity used may be dictated by need (e.g., amount of heat dissipation required), as well as the size of the cavities 30 in the core 12 of the acoustic sandwich panel 10 and the composition (thermal conductivity) of the thermal conductor material (inserts 50).

When inserted into the cavities 30 in the core 12 of the acoustic sandwich panel 10, the thermal conductor material will occupy at least a portion (volume $V_2$) of the volume $V_1$ of each cavity 30. In one expression, the volume $V_2$ of each thermal conductor insert 50 may be at least 2 percent of the volume $V_1$ of the associated cavity 30. In another expression, the volume $V_2$ of each thermal conductor insert 50 may be at least 5 percent of the volume $V_1$ of the associated cavity 30. In another expression, the volume $V_2$ of each thermal conductor insert 50 may be at least 10 percent of the volume $V_1$ of the associated cavity 30. In another expression, the volume $V_2$ of each thermal conductor insert 50 may be at least 20 percent of the volume $V_1$ of the associated cavity 30. In another expression, the volume $V_2$ of each thermal conductor insert 50 may be at least 30 percent of the volume $V_1$ of the associated cavity 30. In another expression, the volume $V_2$ of each thermal conductor insert 50 may be at least 40 percent of the volume $V_1$ of the associated cavity 30. In another expression, the volume $V_2$ of each thermal conductor insert 50 may be at least 50 percent of the volume $V_1$ of the associated cavity 30.

In a third implementation, the inserts 50 of the acoustic sandwich panel 10 may be (or may include) a combination of bulk absorber material and thermal conductor material. Without being limited to any particular theory, it is believed that the presence of both bulk absorber material (inserts 50) and thermal conductor material (inserts 50) in the cavities 30 of the core 12 may further promote sound attenuation and may enhance heat dissipation and, therefore, may be particularly advantageous in the construction of aircraft engines, such as the fan duct walls of bypass gas turbine aircraft engines.

In one variation of the third implementation, the bulk absorber material component of an insert 50 may be compositionally different from the thermal conductor material component of that insert 50. For example, an insert 50 may be introduced to a cavity 30 by separately introducing a bulk absorber material and a thermal conductor material. Alternatively, a composite insert 50 may be prepared, such as by incorporating (e.g., wrapping, weaving, impregnating, etc.) the thermal conductor material into the bulk absorber material (or vice versa), prior to introduction into the cavity 30.

In another variation of the third implementation, the bulk absorber material component of an insert 50 and the thermal conductor material component of that insert 50 may be compositionally one and the same. For example, a bulk absorber/thermal conductor insert 50 may be a metal foam, such as copper foam and/or nickel foam, which may function both as a bulk absorber material and a thermal conductor material.

The quantity of bulk absorber/thermal conductor material used for each insert 50 may depend on various factors, including specific application, size of the associated cavities 30 and the composition of the inserts 50. In one expression, the volume $V_2$ of each bulk absorber/thermal conductor insert 50 may be at least 10 percent of the volume $V_1$ of the associated cavity 30. In another expression, the volume $V_2$ of each bulk absorber/thermal conductor insert 50 may be at least 20 percent of the volume $V_1$ of the associated cavity 30. In another expression, the volume $V_2$ of each bulk absorber/thermal conductor insert 50 may be at least 30 percent of the volume $V_1$ of the associated cavity 30. In another expression, the volume $V_2$ of each bulk absorber/thermal conductor insert 50 may be at least 40 percent of the volume $V_1$ of the associated cavity 30. In another expression, the volume $V_2$ of each bulk absorber/thermal conductor insert 50 may be at least 50 percent of the volume $V_1$ of the associated cavity 30. In another expression, the volume $V_2$ of each bulk absorber/thermal conductor insert 50 may be at least 60 percent of the volume $V_1$ of the associated cavity 30. In another expression, the volume $V_2$ of each bulk absorber/thermal conductor insert 50 may be at least 70 percent of the volume $V_1$ of the associated cavity 30. In another expression, the volume $V_2$ of each bulk absorber/thermal conductor insert 50 may be at least 80 percent of the volume $V_1$ of the associated cavity 30.

Figure 4:
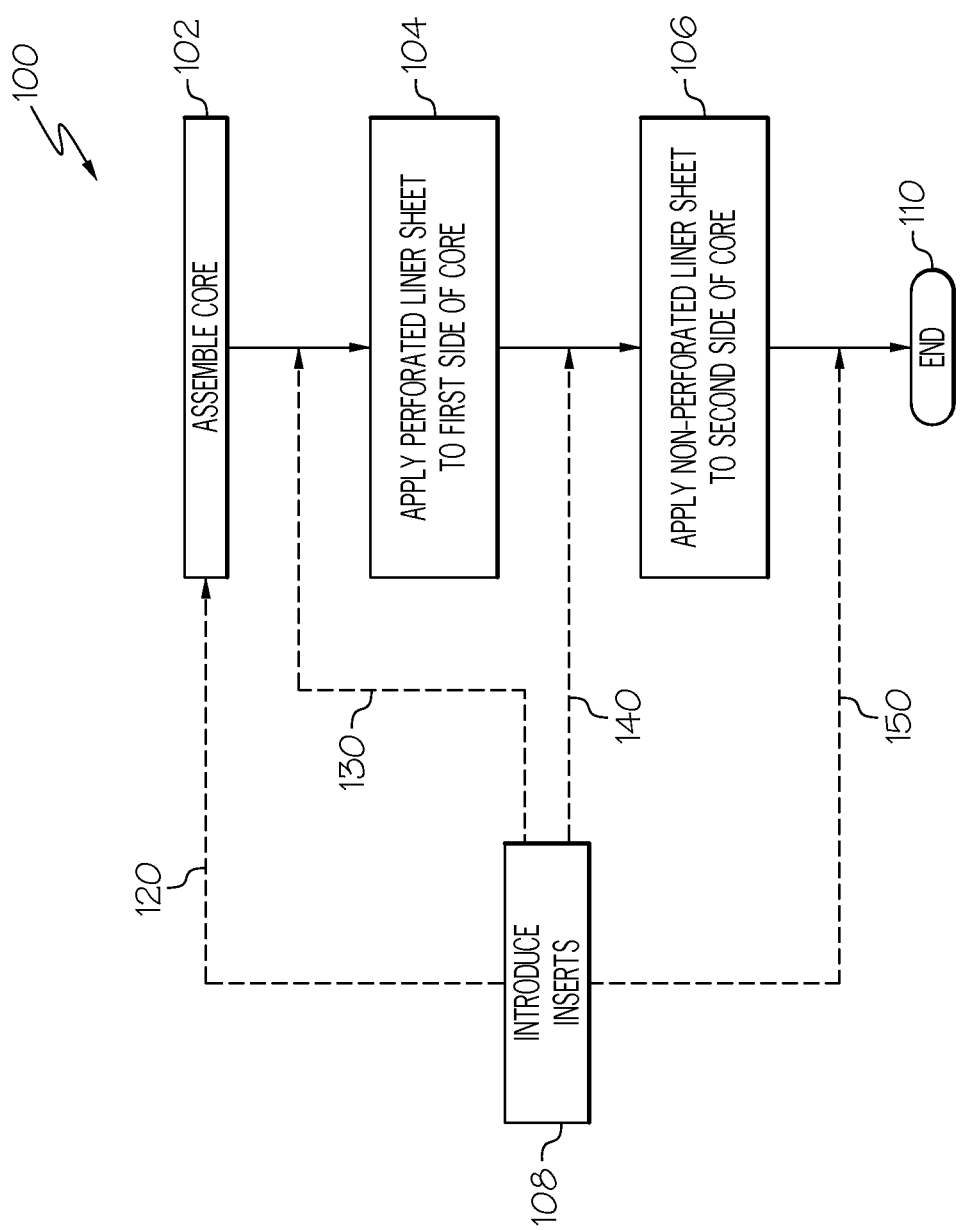
FIG. 4 is a flow diagram illustrating a method for manufacturing an acoustic sandwich panel.

Referring now specifically to FIG. 4 with reference to the acoustic sandwich panel 10 shown in FIGS. 1-3, one embodiment of the disclosed method for manufacturing an acoustic sandwich panel, generally designated 100, may begin at Block 102 with the step of assembling a core 12. The core 12 may be assembled such that the core 12 defines a plurality of cavities 30.

Figure 5:
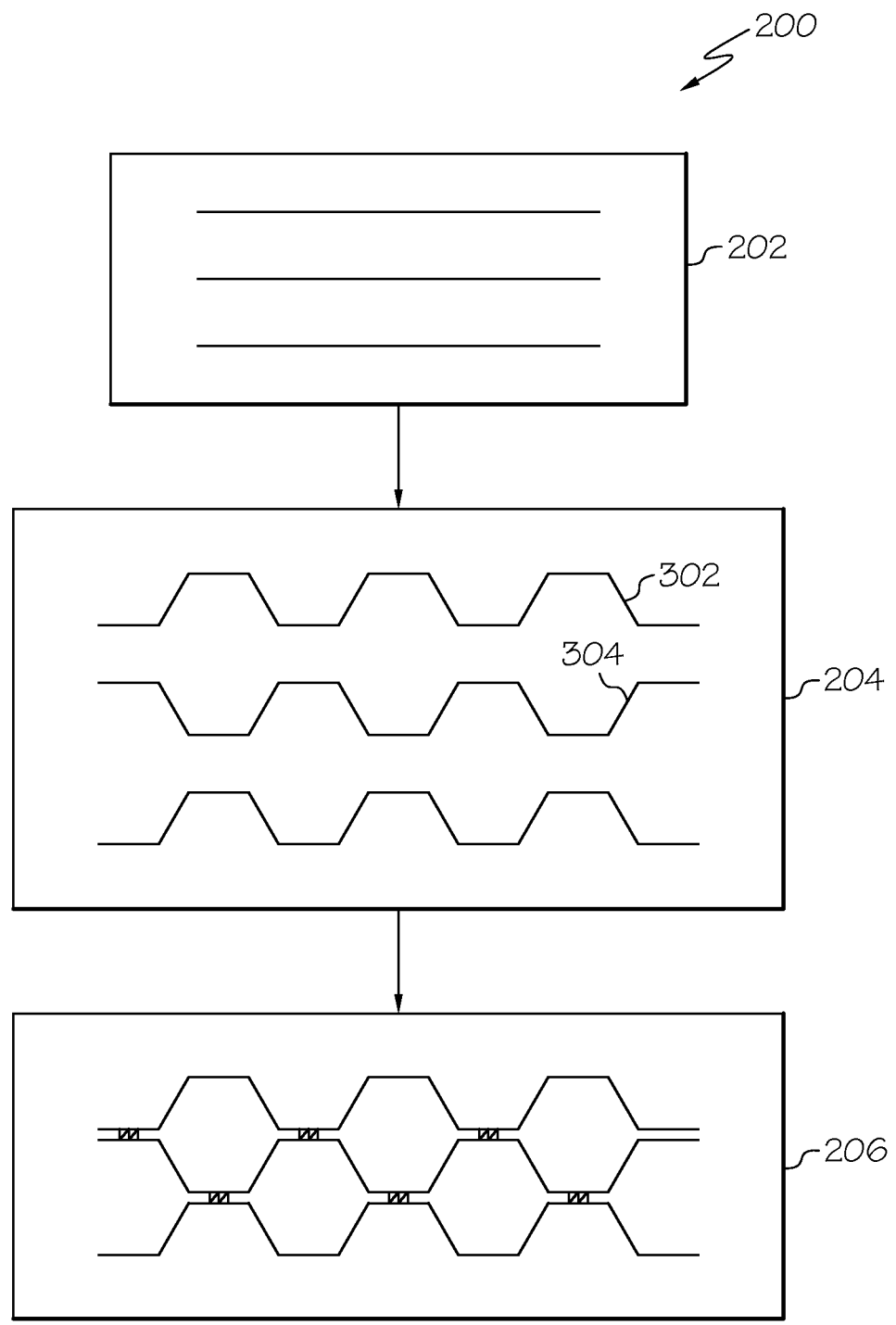
FIG. 5 is a graphical depiction of an example method for assembling a core in accordance with the method of FIG. 4.

Various methods may be used to assemble (Block 102) a core 12 without departing from the scope of the present disclosure. Referring to FIG. 5, one specific assembly method, generally designated 200, may begin at Block 202 with the step of providing a plurality of sheets of core material (e.g., metal, such as steel, titanium alloy or aluminum alloy). At Block 204, the sheets of core material may be formed, such as by stamping, rolling or the like, to yield formed sheets having the designed (e.g., corrugated) cross-sectional profile. Then, at Block 206, the formed sheets may be stacked to form the desired honeycomb structure and connected together, such as by welding.

Referring back to FIG. 4 with reference to the acoustic sandwich panel 10 shown in FIGS. 1-3, at Block 104, a first liner sheet 14 may be applied to the first major side 22 of the core 12. The first liner sheet 14 may define a plurality of apertures 40, which may be positioned to align with associated cavities 30 in the core 12. The first liner sheet 14 may be secured to the core 12, such as by welding, braising, soldering, adhering and/or mechanically fastening.

At Block 106, a second liner sheet 16 may be applied to the second major side 24 of the core 12. The second liner sheet 16 may be secured to the core 12, such as by welding, braising, soldering, adhering and/or mechanically fastening.

At Block 108, inserts 50 may be introduced to the cavities 30 defined by the core 12 of the acoustic sandwich panel 10. The inserts 50 may include bulk absorber material, thermal conductor material or both bulk absorber and thermal conductor material. As shown by lines 120, 130, 140, 150, the inserts 50 may be introduced at various stages of the method 100. The method 100 may come to an end at Block 110.

Figure 6:
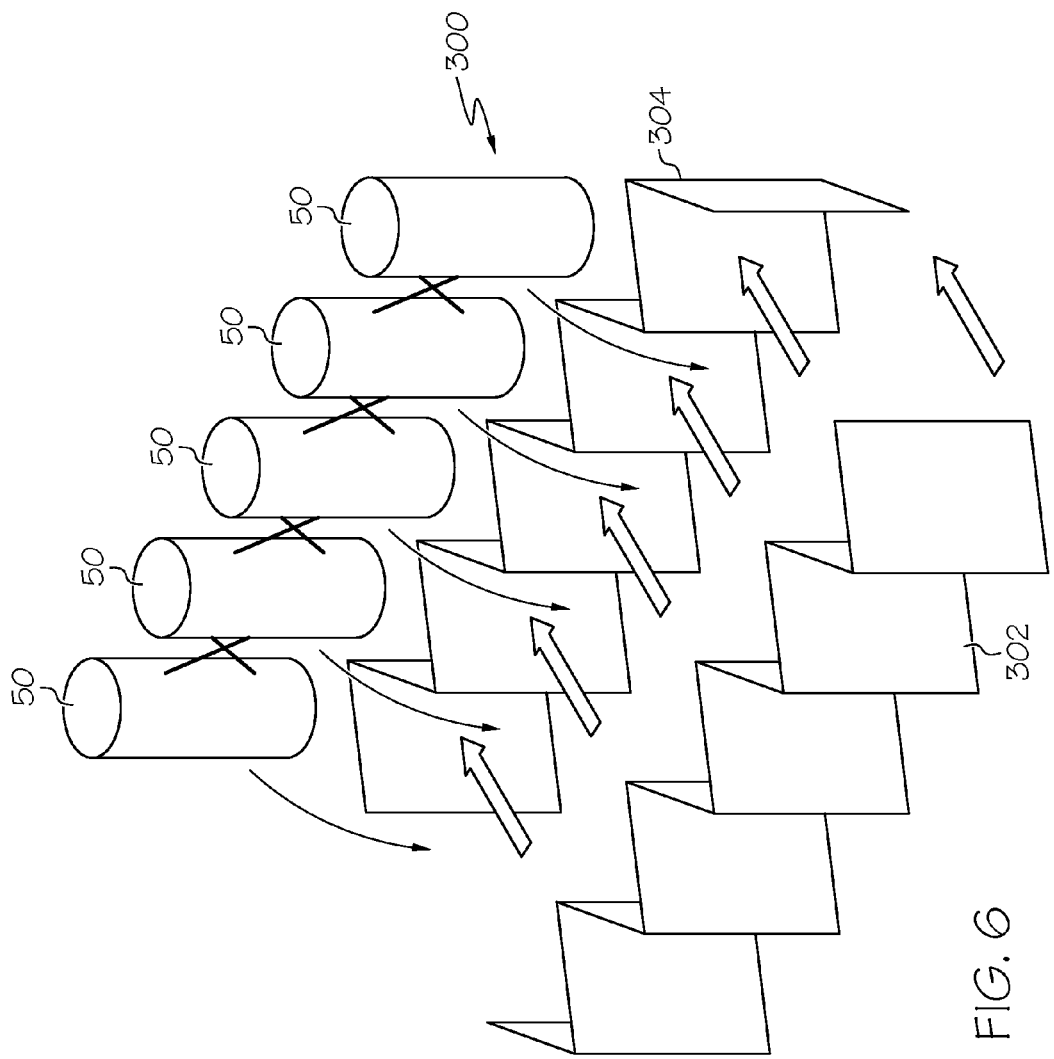
FIG. 6 is a graphical depiction of one method for introducing a bulk absorber material and/or a thermal conductor material in accordance with the method of FIG. 4.

Referring to FIG. 6, in one aspect, the inserts 50 may be introduced to the cavities 30 of the core 12 during assembly of the core 12 (see line 120 in FIG. 4). For example, a strip 300 of interconnected inserts 50 may be positioned between two adjacent formed sheets 302, 304. (See Block 204 of FIG. 5.) Then, after the strip 300 has been positioned between the formed sheets as desired, the formed sheets may be connected (e.g., by welding), as shown in Block 206 of FIG. 5.

Figure 7:
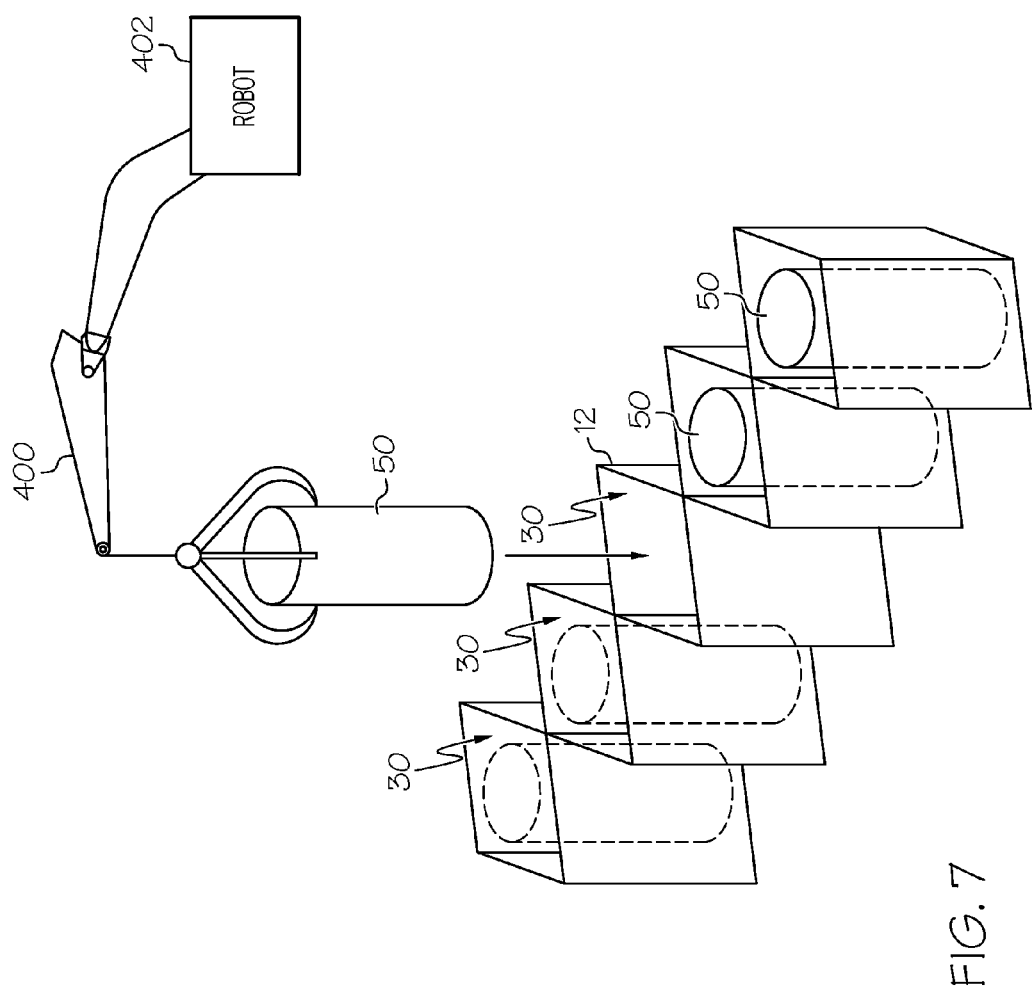
FIG. 7 is a graphical depiction of another method for introducing a bulk absorber material and/or a thermal conductor material in accordance with the method of FIG. 4.

Referring to FIG. 7, in another aspect, the inserts 50 may be introduced to the cavities 30 of the core 12 after assembly of the core 12, but prior to application of the final liner sheet (e.g., the second liner sheet 16) to the core 12 (see lines 130, 140 in FIG. 4). Therefore, as shown in FIG. 7, the inserts 50 may be placed directly into pre-formed cavities 30 within the core 12. For example, the mechanical arm 400 of a robot 402 (e.g., a pick-and-place robot) may precisely position the inserts 50 into associated cavities 30 of the core 12.

Figure 8:
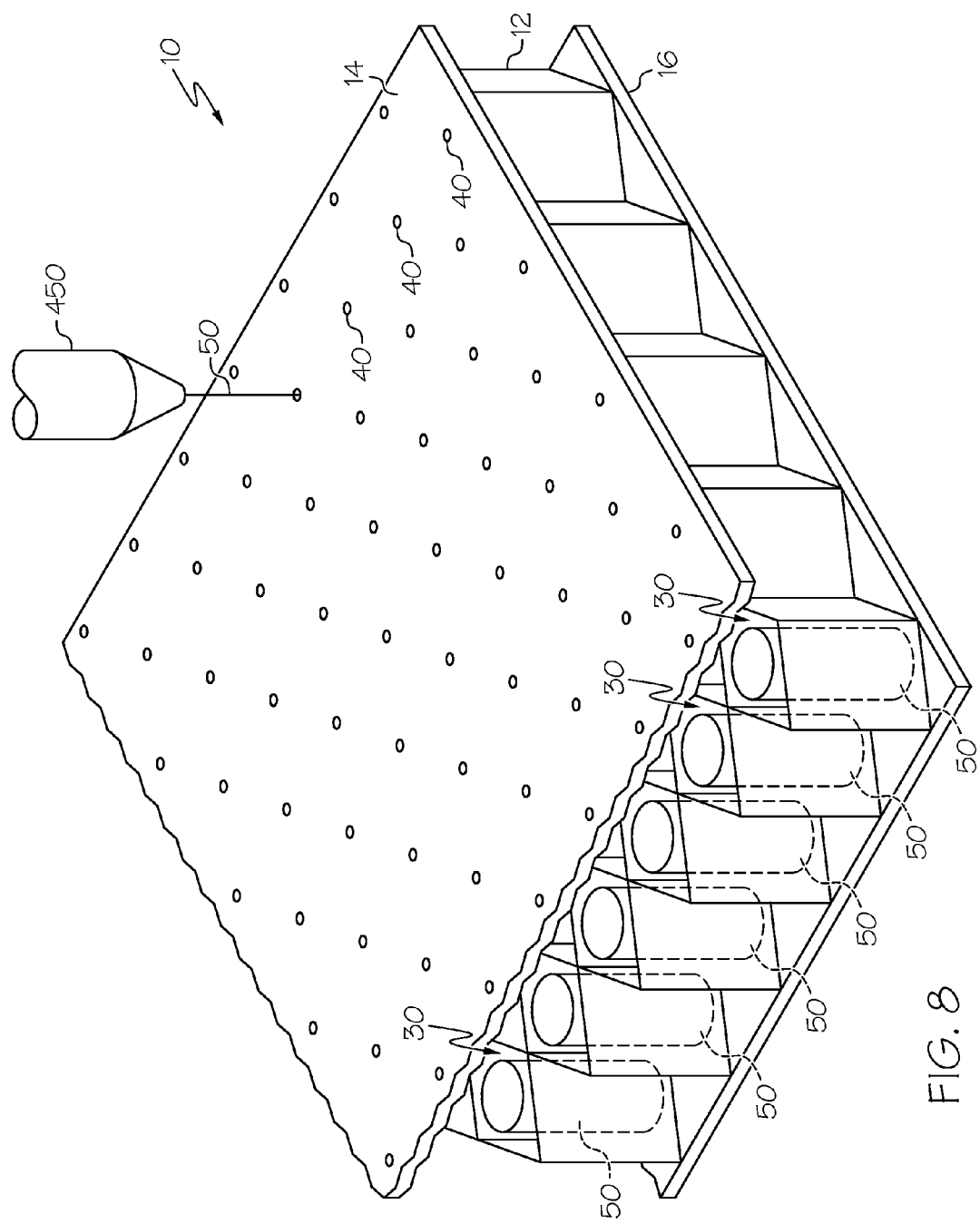
FIG. 8 is a graphical depiction of yet another method for introducing a bulk absorber material and/or a thermal conductor material in accordance with the method of FIG. 4.

Referring to FIG. 8, in yet another aspect, the inserts 50 may be introduced to the cavities 30 of the core 12 after application of the final liner sheet (e.g., the second liner sheet 16) to the core 12 (see line 150 in FIG. 4). Specifically, as shown in FIG. 8, once the final liner sheet has been applied, the inserts 50 may be introduced to the cavities 30 by way of the apertures 40 in the first line sheet 14. For example, a nozzle 450 may inject inserts 50 into associated cavities 30 by way of the apertures 40. The injection process may be monitored (e.g., timed) to ensure delivery of the desired quantity (e.g., a pre-defined length of wire and/or a pre-defined volume) of bulk absorber/thermal conductor material into each cavity 30.

Thus, the disclosed method 100 (FIG. 4) may yield an acoustic sandwich panel that incorporates a bulk absorber material and/or a thermal conductor material into the Helmholtz resonator cavities defined by the core of the acoustic sandwich panel.

Figure 9:
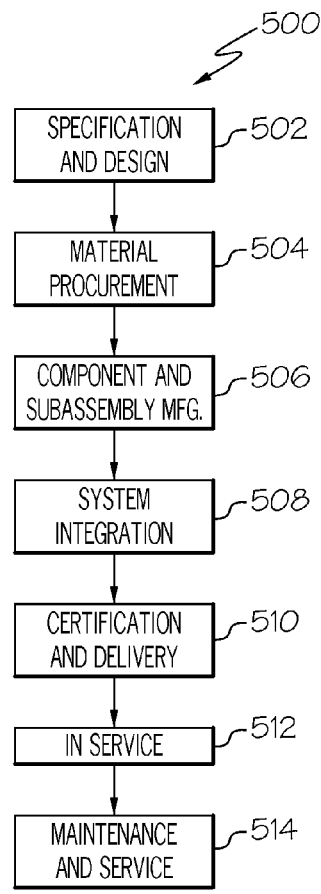
FIG. 9 is a flow diagram of an aircraft manufacturing and service methodology.
Figure 10:
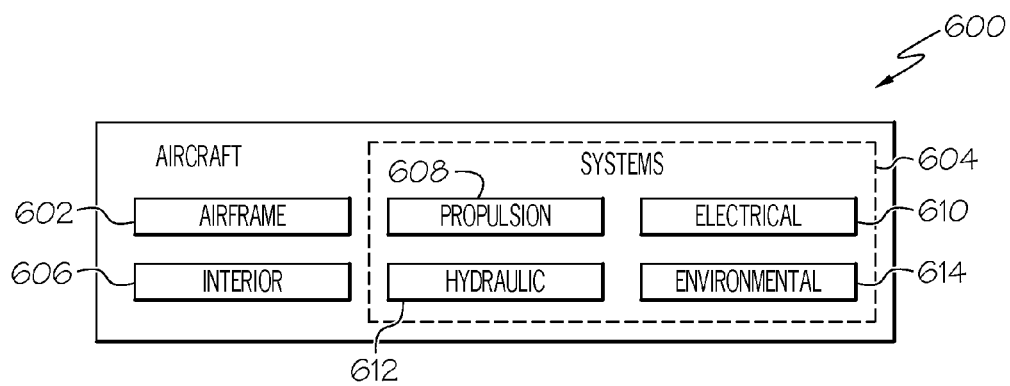
FIG. 10 is a block diagram of an aircraft.

Examples of the present disclosure may be described in the context of an aircraft manufacturing and service method 500 as shown in FIG. 9 and an aircraft 600 as shown in FIG. 10. During pre-production, the illustrative method 500 may include specification and design, as shown at block 502, of the aircraft 600 and material procurement, as shown at block 504. During production, component and subassembly manufacturing, as shown at block 506, and system integration, as shown at block 508, of the aircraft 600 may take place.

Thereafter, the aircraft 600 may go through certification and delivery, as shown block 510, to be placed in service, as shown at block 512. While in service, the aircraft 600 may be scheduled for routine maintenance and service, as shown at block 514. Routine maintenance and service may include modification, reconfiguration, refurbishment, etc. of one or more systems of the aircraft 600.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 600 produced by illustrative method 500 (FIG. 9) may include an airframe 602 with a plurality of high-level systems 604 and an interior 606. Examples of high-level systems 604 may include one or more of propulsion system 608, electrical system 610, hydraulic system 612, and environmental system 614. Any number of other systems may be included. Although an aerospace example is shown, the principles disclosed herein may be applied to other industries, such as the automotive and marine industries. Accordingly, in addition to the aircraft 600, the principles disclosed herein may apply to other vehicles (e.g., land vehicles, marine vehicles, space vehicles, etc.).

The disclosed acoustic sandwich panel may be employed during any one or more of the stages of the manufacturing and service method 500. For example, components or subassemblies corresponding to component and subassembly manufacturing (block 506) may be fabricated or manufactured using the disclosed acoustic sandwich panel. Also, the disclosed acoustic sandwich panel may be utilized during production stages (blocks 506 and 508), for example, by substantially expediting assembly of or reducing the cost of aircraft 600, such as the airframe 602 and/or the interior 606. Similarly, the disclosed acoustic sandwich panel may be utilized, for example and without limitation, while aircraft 600 is in service (block 512) and/or during the maintenance and service stage (block 514).

Although various embodiments of the disclosed acoustic sandwich panel and method have been shown and described, modifications may occur to those skilled in the art upon reading the specification. The present application includes such modifications and is limited only by the scope of the claims.

What is claimed is:

1. A method for manufacturing an acoustic sandwich panel comprising:
    assembling a core having a first major side, a second major side, and defining a plurality of cavities;
    applying a first liner sheet to said first major side, said first liner sheet defining a plurality of apertures;
    applying a second liner sheet to said second major side; and
    introducing a plurality of inserts to said plurality of cavities, wherein each insert of said plurality of inserts comprises at least one of a bulk absorber material and a thermal conductor material, wherein said introducing step is performed during said assembling step.

2. The method of claim 1 wherein said core comprises a honeycomb structure.

3. The method of claim 1 wherein each insert of said plurality of inserts comprises said bulk absorber material.

4. The method of claim 1 wherein each cavity of said plurality of cavities has a volume, and wherein at least 50 percent of said volume is occupied by said bulk absorber material after said introducing step.

5. The method of claim 1 wherein each insert of said plurality of inserts comprises said thermal conductor material.

6. The method of claim 1 wherein each insert of said plurality of inserts comprises said bulk absorber material and said thermal conductor material.

7. The method of claim 1 wherein said core has a first cross-sectional thickness and said first liner sheet has a second cross-sectional thickness, and wherein said first cross-sectional thickness is at least 1.5 times said second cross-sectional thickness.

8. The method of claim 1 wherein each insert of said plurality of inserts comprises said bulk absorber material, and wherein said bulk absorber material is one of a foam and a felted material.

9. The method of claim 1 wherein each insert of said plurality of inserts comprises said bulk absorber material, and wherein said bulk absorber material comprises aluminum oxide fibers.

10. The method of claim 1 wherein each insert of said plurality of inserts comprises said thermal conductor material, and wherein said thermal conductor material has a thermal conductivity of at least 50 W/(m·K).

11. A method for manufacturing an acoustic sandwich panel comprising:
assembling a core having a first major side, a second major side, and defining a plurality of cavities;
applying a first liner sheet to said first major side, said first liner sheet defining a plurality of apertures;
applying a second liner sheet to said second major side; and
introducing a plurality of inserts to said plurality of cavities, wherein each insert of said plurality of inserts comprises at least one of a bulk absorber material and a thermal conductor material, wherein said plurality of inserts are introduced to said plurality of cavities by way of said plurality of apertures.

12. The method of claim 11 wherein said core comprises a honeycomb structure.

13. The method of claim 11 wherein each insert of said plurality of inserts comprises said bulk absorber material.

14. The method of claim 11 wherein each cavity of said plurality of cavities has a volume, and wherein at least 50 percent of said volume is occupied by said bulk absorber material after said introducing step.

15. The method of claim 11 wherein each insert of said plurality of inserts comprises said thermal conductor material.

16. The method of claim 11 wherein each insert of said plurality of inserts comprises said bulk absorber material and said thermal conductor material.

17. The method of claim 11 wherein said core has a first cross-sectional thickness and said first liner sheet has a second cross-sectional thickness, and wherein said first cross-sectional thickness is at least 1.5 times said second cross-sectional thickness.

18. The method of claim 11 wherein each insert of said plurality of inserts comprises said bulk absorber material, and wherein said bulk absorber material is one of a foam and a felted material.

19. The method of claim 11 wherein each insert of said plurality of inserts comprises said bulk absorber material, and wherein said bulk absorber material comprises aluminum oxide fibers.

20. The method of claim 11 wherein each insert of said plurality of inserts comprises said thermal conductor material, and wherein said thermal conductor material has a thermal conductivity of at least 50 W/(m·K).

\* \* \* \* \*